US012563162B2

(12) United States Patent
Danziger

(10) Patent No.: US 12,563,162 B2
(45) Date of Patent: Feb. 24, 2026

(54) IMAGE PROJECTOR WITH LED ARRAY ILLUMINATION

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 395 days.

(21) Appl. No.: 18/038,236

(22) PCT Filed: Feb. 9, 2022

(86) PCT No.: PCT/IL2022/050164
§ 371 (c)(1),
(2) Date: May 23, 2023

(87) PCT Pub. No.: WO2022/172268
PCT Pub. Date: Aug. 18, 2022

(65) Prior Publication Data
US 2024/0098230 A1     Mar. 21, 2024

Related U.S. Application Data

(60) Provisional application No. 63/147,365, filed on Feb. 9, 2021.

(51) Int. Cl.
*H04N 9/31* (2006.01)
*G03B 21/20* (2006.01)

(52) U.S. Cl.
CPC ....... *H04N 9/3138* (2013.01); *G03B 21/2013* (2013.01); *G03B 21/2066* (2013.01)

(58) Field of Classification Search
CPC .. H04N 9/3138; H04N 9/3155; H04N 9/3182; H04N 9/3164; G03B 21/2013; G03B 21/2066; G03B 21/005; G03B 21/28; G03B 21/2033; G02B 27/017
USPC .......................................................... 353/99
See application file for complete search history.

(56) References Cited

U.S. PATENT DOCUMENTS

| | | |
|---|---|---|
| 7,021,777 B2 | 4/2006 | Amitai |
| 7,577,326 B2 | 8/2009 | Amitai |
| 7,751,122 B2 | 7/2010 | Amitai |
| 8,000,020 B2 | 8/2011 | Amitai |
| 8,096,665 B2 * | 1/2012 | Bellis ................... G03B 21/008 |
| | | 345/3.4 |
| 8,643,948 B2 | 2/2014 | Amitai et al. |
| 9,025,253 B2 | 5/2015 | Hadad et al. |
| 9,551,880 B2 | 1/2017 | Amitai |

(Continued)

FOREIGN PATENT DOCUMENTS

| | | |
|---|---|---|
| WO | 2019111237 | 6/2019 |
| WO | 2020157650 | 8/2020 |

*Primary Examiner* — Magda Cruz
(74) *Attorney, Agent, or Firm* — Rivka Friedman

(57) ABSTRACT

A projector for projecting an image includes an LED array (2) having separately-controllable LEDs for illuminating a spatial light modulator (SLM) (10) via illumination optics (8) with a converging beam. Projection optics (12) projects the image generated by the SLM. A reflective arrangement (16) typically having four planar reflectors, is deployed between the LED array (2) and the illumination optics (8) so that light from each of LED illuminates a first region of the SLM by direct transmission from the LED via the illumination optics and additional regions of the SLM via reflection in the planar reflectors.

14 Claims, 7 Drawing Sheets

(56) References Cited

U.S. PATENT DOCUMENTS

| | | | |
|---|---|---|---|
| 10,551,544 | B2 | 2/2020 | Danziger et al. |
| 10,571,636 | B2 | 2/2020 | Gelberg |
| 10,739,598 | B2 | 8/2020 | Ofir |
| 10,809,528 | B2 | 10/2020 | Amitai |
| 10,830,938 | B2 | 11/2020 | Eisenfeld |
| 10,969,590 | B1 | 4/2021 | Danziger et al. |
| 12,124,050 | B2 | 10/2024 | Danziger et al. |
| 12,222,508 | B2 | 2/2025 | Ronen et al. |
| 2013/0343051 | A1 | 12/2013 | Holbert et al. |
| 2017/0363799 | A1 | 12/2017 | Ofir et al. |
| 2018/0039082 | A1 | 2/2018 | Amitai |
| 2018/0067315 | A1 | 3/2018 | Amitai et al. |
| 2018/0157057 | A1 | 6/2018 | Gelberg et al. |
| 2019/0137859 | A1* | 5/2019 | Dewald .............. G03B 21/2013 |
| 2020/0209667 | A1 | 7/2020 | Sharlin et al. |
| 2020/0371311 | A1 | 11/2020 | Lobachinsky et al. |
| 2021/0072553 | A1* | 3/2021 | Danziger ............. H04N 9/3105 |
| 2022/0030205 | A1 | 1/2022 | Danziger |
| 2022/0128816 | A1 | 4/2022 | Danziger et al. |
| 2022/0342216 | A1 | 10/2022 | Danziger et al. |
| 2022/0360751 | A1 | 11/2022 | Greenstein et al. |
| 2022/0390754 | A1 | 12/2022 | Grabarnik et al. |

\* cited by examiner

FIG. 6

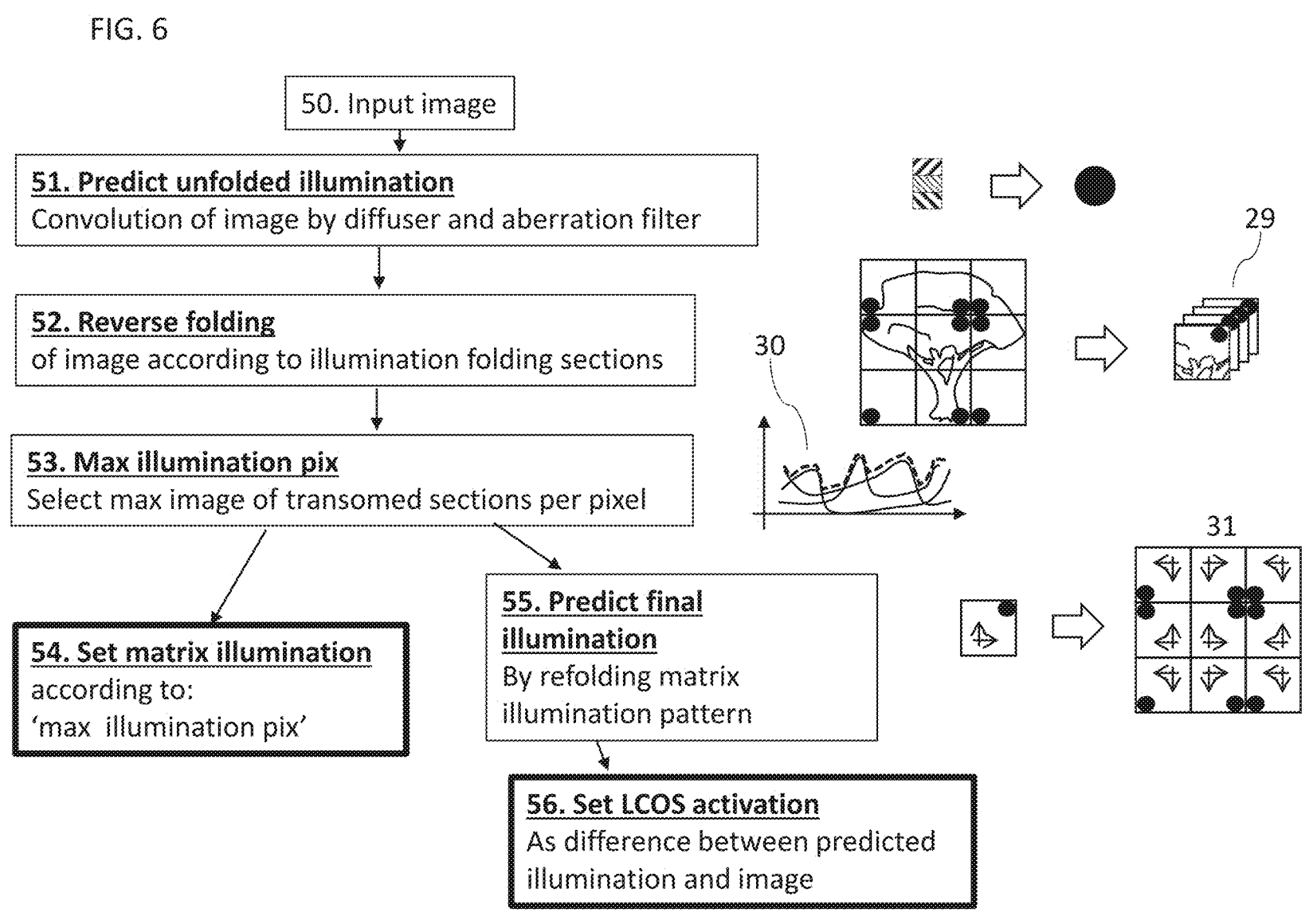

50. Input image

51. Predict unfolded illumination
Convolution of image by diffuser and aberration filter

52. Reverse folding
of image according to illumination folding sections

53. Max illumination pix
Select max image of transomed sections per pixel

54. Set matrix illumination
according to:
'max illumination pix'

55. Predict final illumination
By refolding matrix illumination pattern

56. Set LCOS activation
As difference between predicted illumination and image

29

30

31

IMAGE PROJECTOR WITH LED ARRAY ILLUMINATION

FIELD AND BACKGROUND OF THE INVENTION

The present invention relates to image projectors and, in particular, it concerns image projectors employing an LED array as an illumination source.

It is known to project an image by illuminating a spatial light modulator, such as a liquid crystal display (LCD), liquid crystal on silicon (LCOS) modulator or a digital micromirror device of a digital light processing (DLP) system, and collimating the modulated image for output to an eye of a user. Such projectors are often used in near eye displays, where the projected image is typically introduced into a transparent light guide along which the image propagates by internal reflection until being coupled out to the eye of the user, typically by partially-reflective surfaces or by diffractive elements.

SUMMARY OF THE INVENTION

The present invention is an image projector employing an LED array as an illumination source.

According to the teachings of an embodiment of the present invention there is provided, a projector for projecting an image comprising: (a) an LED array comprising a plurality of separately-controllable LEDs for generating illumination; (b) a spatial light modulator (SLM) deployed for modulating an optical property of incident illumination for generating an image; (c) illumination optics deployed to receive illumination from the LEDs and direct the illumination as a converging beam towards the SLM; (d) projection optics deployed to project the image generated by the SLM so as to generate a projected image; and (e) a reflective arrangement comprising at least three planar reflectors, the reflective arrangement being deployed between the LED array and the illumination optics such that light from each of the LEDs illuminates a first region of the SLM by direct transmission from the LED via the illumination optics and additional regions of the SLM, distinct from the first region, via reflection in at least one of the planar reflectors, the at least three planar reflectors forming a polygonal shape.

According to a further feature of an embodiment of the present invention, the reflective arrangement comprises four of the planar reflectors deployed to form a rectangular shape, the plane reflectors generating a set of at least nine distinct regions of illumination on the SLM for each of the LEDs.

According to a further feature of an embodiment of the present invention, the four planar reflectors form two pairs of parallel reflectors. According to an alternative feature of an embodiment of the present invention, the four planar reflectors include at least one pair of diverging reflectors, or at least one pair of converging reflectors.

According to a further feature of an embodiment of the present invention, the four planar reflectors are provided by external surfaces of a light-guiding prism.

According to a further feature of an embodiment of the present invention, an end of the reflective arrangement defines an illumination stop, and wherein the illumination stop is imaged by the illumination optics and the projection optics onto an exit aperture of the projector.

According to a further feature of an embodiment of the present invention, there is also provided a controller including at least one processor, the controller being associated with the LED array and with the SLM, the controller being configured to: (a) receive pixel data for an image to be projected; (b) for each of the LEDs, determine a maximum pixel value occurring within the distinct regions illuminated by the LED; (c) determine a required level of illumination for each of the LEDs to generate the corresponding maximum pixel value, (d) calculate scaled pixel values for pixels of the SLM to generate pixel outputs corresponding to the image to be projected when illuminated by the LEDs according to the required levels of illumination; (e) actuate the SLM according to the scaled pixel values; and (f) actuate the LED array according to the required levels of illumination.

BRIEF DESCRIPTION OF THE DRAWINGS

The invention is herein described, by way of example only, with reference to the accompanying drawings, wherein:

FIG. 6 is a flow diagram illustrating operation of a controller to generate a desired output image employing the image projector of FIG. 3.

DESCRIPTION OF THE PREFERRED EMBODIMENTS

The present invention is an image projector employing an LED array as an illumination source.

The principles and operation of image projectors according to the present invention may be better understood with reference to the drawings and the accompanying description.

Figure 1:
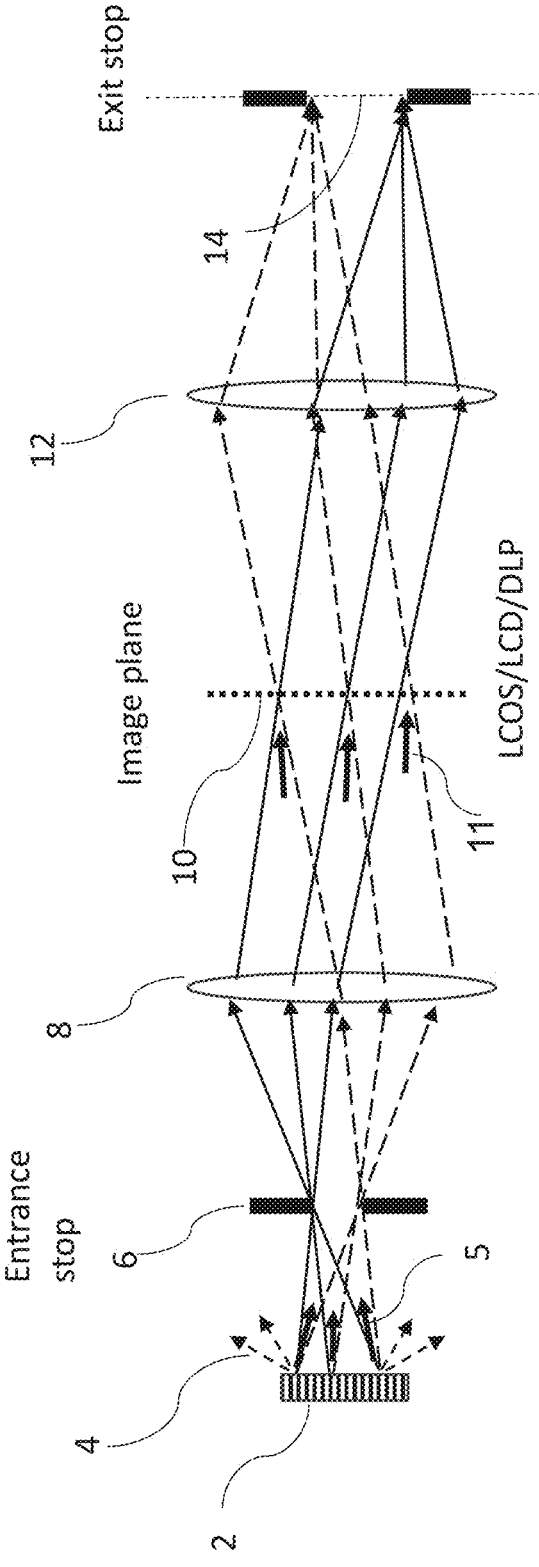
FIG. 1 is a schematic representation of an optical arrangement of an image projector illustrating a distribution of illumination from an LED array light source.
Figure 2:
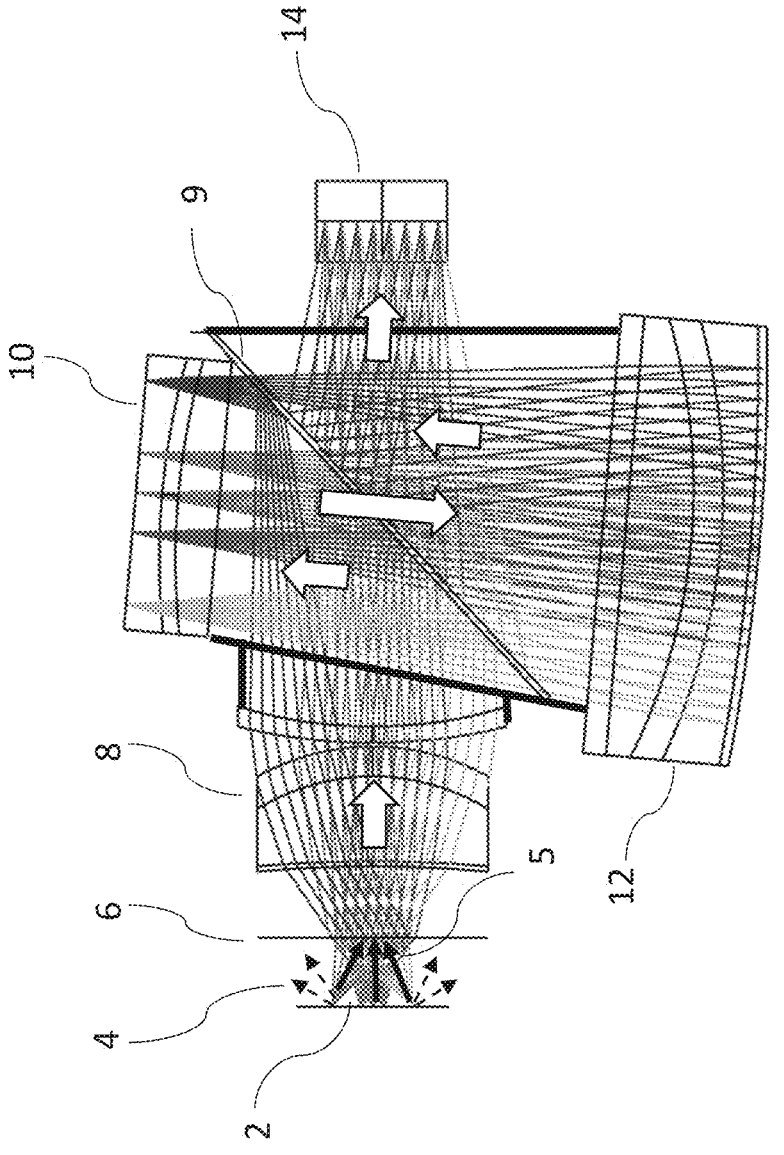
FIG. 2 is a side view of an implementation of the optical arrangement of FIG. 1 employing a reflective spatial light modulator and based on a polarizing beam splitter configuration.

Referring now to the drawings, FIGS. 1 and 2 illustrate schematically an image projector for projecting a collimated image via an exit stop 14. The illumination passes through an image plane 10 where an image is generated by a spatial light modulator (SLM) providing a two-dimensional array of pixel elements, each of the pixel elements being controllable to modulate a property, typically polarization, of light transmitted or reflected by the pixel element. An example of a transmitted light SLM is a liquid crystal display (LCD), while an example of a reflective SLM is a liquid crystal on silicon (LCOS) device or a digital light processing (DLP) device. The schematic representation of FIG. 1 illustrates progression along an optical path from left to right, but it will be appreciated that this optical path can be folded at various reflective elements, including at an LCOS located at the imaging plane 10, as illustrated in FIG. 2. A collimating arrangement 12 of at least one optical element is configured to collimate illumination from the image plane (SLM) to generate a collimated image directed to exit stop 14, typically for injection into a light-guide optical element (waveguide) for delivering to the eye of the user.

The image projector also includes an illumination arrangement delivering illumination from an illumination stop 6, and illumination optics 8 deployed in the optical path between illumination stop 6 and image plane 10. Preferably, to enhance optical efficiency, illumination optics 8 and collimating arrangement 12 are configured such that an image of illumination stop 6 falls substantially on exit stop 14. This achieves "pupil imaging", ensuring that illumination rays directed from illumination stop 6 towards the SLM are efficiently directed towards the exit stop 14.

The present invention relates particularly to image projectors in which the illumination source is an LED array 2. The LED array 2 is preferably directed by illumination optics 8 to form a converging beam (either brought to focus, or to slightly off-focus) on the SLM so that selective illumination of the LED array generates selective illumination of different regions of the SLM. This allows selective illumination of regions of the SLM where image content is to be generated while conserving energy by not illuminating regions where no image is being displayed (as is common in augmented reality applications). Such power savings are particularly important for near-eye display applications, where power efficiency is critical for compact and lightweight implementations.

The LED array is typically of dimensions commonly referred to as a "mini-LED array", which is abbreviated hereinbelow as mLEDa, but the invention is not necessarily limited to any particular dimensions or hardware implementation of the LED array.

Light from activated pixels in the mLEDa 2 is typically emitted in a Lambertian distribution, where some of the light 5 passes through the aperture of illumination stop 6 into the system while much of the light 4 is transmitted at higher angles and is lost.

The pixels in mLEDa can be of color, in this case it is preferable to introduce a light diffuser that blurs the image of the pixels from mLEDa 2 reaching image plane 10, thereby enabling uniform color distribution. Alternatively, the mLEDa 2 transmits white light and the pixels on matrix 10 have a color filter per pixel. In this case minimal diffusing is needed.

The Lambertian distribution from mLEDa is typically a cone of approximately 120 degrees while the light cone that is actually used 5 is at approximately 30 degrees. In this scenario, the lost light 4 is close to 94% of the light generated by the mLEDa and the collection efficiency is only 6%. It may theoretically be possible to reduce these losses by positioning the LED array closer to the illumination optics, but this would require illumination optics with a much shorter focal length, which presents implementation problems. Additionally, the preferred optical arrangement as described above has pupil-imaging between the illumination stop 6 and the exit stop 14, while the mLEDa illumination 5 is preferably a converging (focused or near-focused) defined patch on the SLM plane 10, which is collimated at exit stop 14, therefore requiring significant spacing between the illumination source and the illumination stop.

FIG. 2 shows an exemplary implementation of such a system. The light from mLEDa 2 is optionally partly focused at illumination stop pupil plane 6 (presented here as a paraxial lens) and by lens 8. The light is reflected by PBS 9 onto the LCOS (or another image generator) at image plane

10 (shown here with a field-lens adjacent to its surface. The reflected light passes through PBS 9 onto collimating reflective lens 12 (which is shown as a compound lens with refractive components) and from there is reflected at PBS 9 to exit pupil 14.

Here, and throughout this document, wherever sequences of reflection/transmission or transmission/reflection at a polarizing beam splitter (PBS) are illustrated, it is to be understood that polarization-switching components, such as a half-wave plate for a single transmission or a quarter-wave plate for a double-pass reflective interface, are provided to achieve the desired behavior of the light path, all as is well-known in the art. In the case of an LCOS SLM, no such element is typically needed, since the operation of the LCOS itself is to selectively rotate the polarization as a function of the pixel values.

Figure 3:
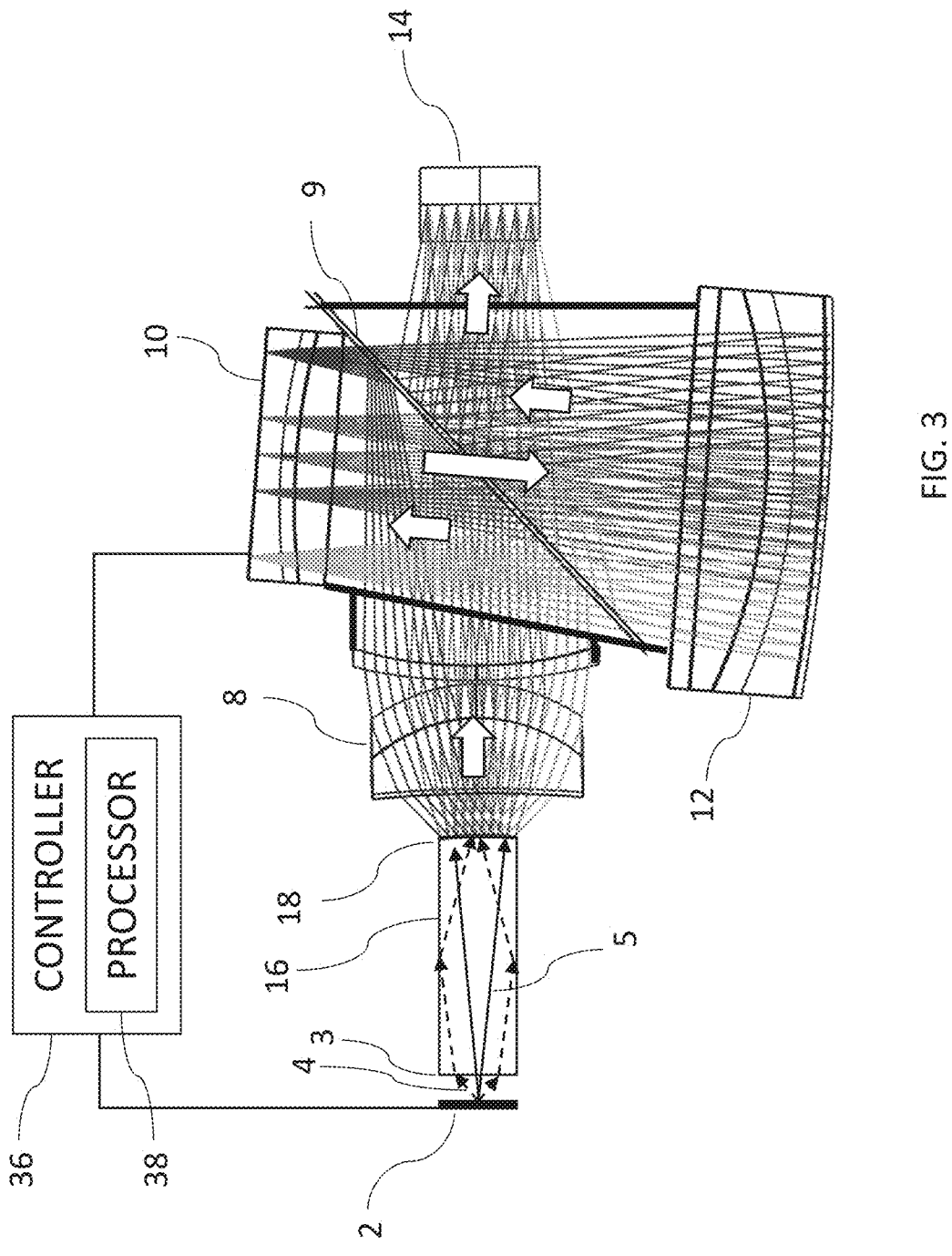
FIG. 3 is a side view of an image projector according to an aspect of the present invention, employing a reflective arrangement interposed between the LED array light source and illumination optics.

Turning now to FIG. 3, this illustrates a projector according to a non-limiting but particularly preferred embodiment of the present invention for projecting an image. In many respects, the projector is similar to that of FIG. 2, including an LED array 2 having a plurality of separately-controllable LEDs for generating illumination, a spatial light modulator (SLM) 10 deployed for modulating an optical property of incident illumination for generating an image, illumination optics 8 deployed to receive illumination from the LEDs and direct the illumination as a converging beam towards the SLM, and projection optics 12 deployed to project the image generated by the SLM so as to generate a projected image, preferably a collimated image, shown at exit stop 14.

The projector of FIG. 3 is distinguished from that of FIG. 2 by inclusion of a reflective arrangement 16 including at least three, and preferably four, planar reflectors, deployed between the LED array 2 and the illumination optics 8. In cross-section perpendicular to the optical axis of light passing from LED array 2 to illumination optics 8, the planar reflectors preferably forming a polygonal shape according to the number of reflectors, e.g., triangular for 3 reflectors, and square or otherwise rectangular for 4 reflectors. In the preferred implementation illustrated here, the reflectors extend parallel to the optical axis. As a result of this structure, light from each of the LEDs and converging towards focus, or near-focus, at the image plane 10 illuminates a first region of the SLM by direct transmission from the LED via the illumination optics and additional regions of the SLM, distinct from the first region, via reflection in at least one of the planar reflectors.

The phrase "direct transmission" is used herein to refer to passage of light through the reflective arrangement without reflection by any of the reflectors, but does not exclude the use of reflective elements in the illumination optics 8 or the presence of a PBS 9, which act on all regions of the illumination.

In the particularly preferred implementation illustrated here, the reflective arrangement is made up of four planar reflectors deployed to form an equilateral or non-equilateral rectangular shape in lateral cross-section (an "equilateral rectangle" being synonymous with a "square", which is hereby explicitly included in the definition of "rectangular"), typically formed as two pairs of parallel reflectors. In one particularly preferred but non-limiting example, the reflectors are provided by external surfaces of a light-guiding prism, in this example, a cuboid prism, most preferably with square entry and exit surfaces. The exit surface may optionally be formed non-planar, with refractive power.

Thus, FIG. 3 shows mLEDa 2 adjacent to reflective arrangement 16 implemented as a transparent prism. Direct transmitted light 5 enters the reflective arrangement, typically via a small air-gap 3, and passes through the reflective arrangement, optionally refracting at exit 18, which preferably serves as the illumination stop of the system. This exit 18 from the reflective arrangement may advantageously be provided with a light diffuser or micro-lens array. The remainder of the optical path is similar to that described for FIG. 2, above, with the illumination stop of exit 18 preferably being imaged to the exit pupil 14 of the projector, as described above. The light 4 emerging at high angle from the mLEDa 2 also enters reflective arrangement 16, but reflects from its face by total-internal-reflection (TIR) or if needed by reflective coating on the face of 16. This light (shown as dashed arrows) also emerges from 16 into the optics but at high angles, therefore will illuminate high angles of the field.

Figure 4:
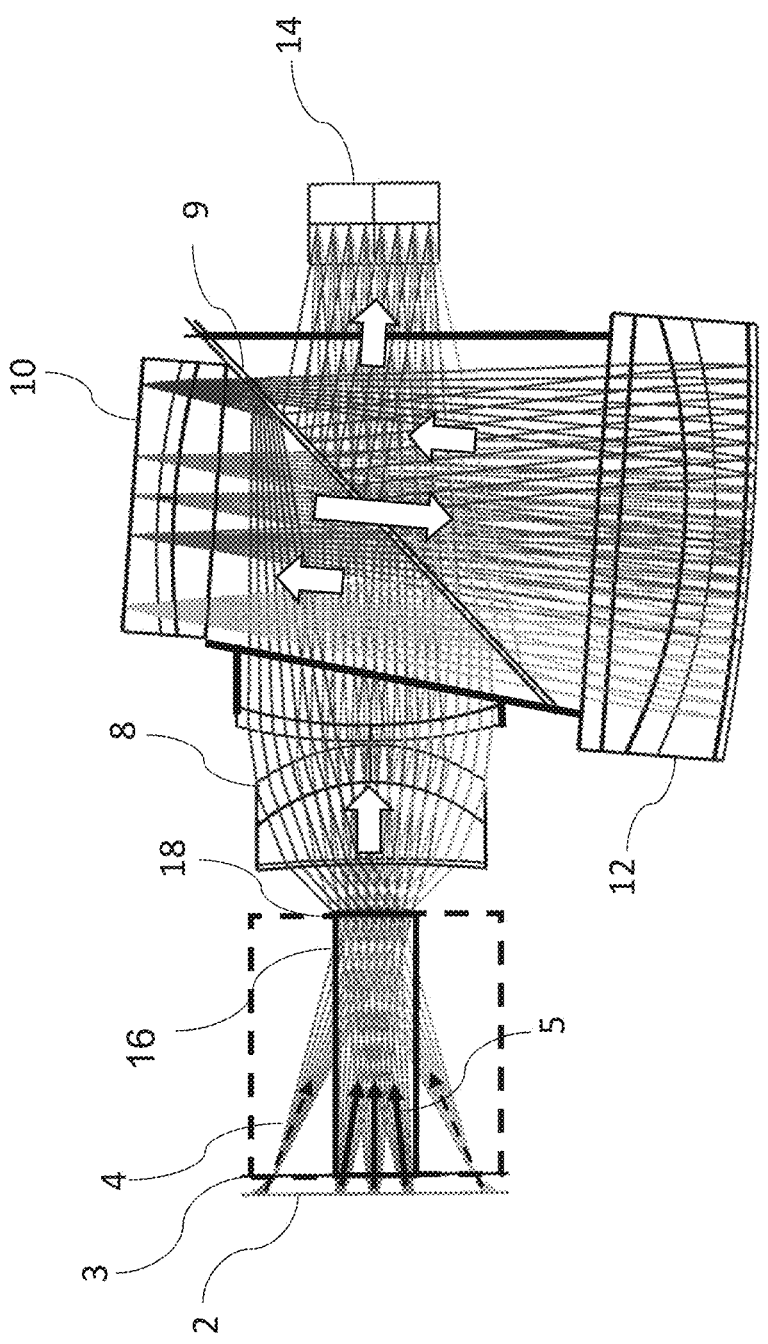
FIG. 4 is a schematic representation illustrating light paths equivalent to those generated by the reflective arrangement of FIG. 3 when unfolded.

FIG. 4 shows an unfolded schematic representation of FIG. 3. The reflective arrangement 16 is unfolded as shown by dashed rectangle while the high angle light 4 is shown without the reflection, i.e., as if emanating from a mirror image of the LED array. The high angle of these beams in glass and in air is apparent and the collection cone of light can be in the order of 90 degrees. The collection efficiency from a 120 degrees Lambertian emittance is thus about 60%, which is ten times more than is typically collected in a free space such as is shown in FIG. 2.

Figure 5B:
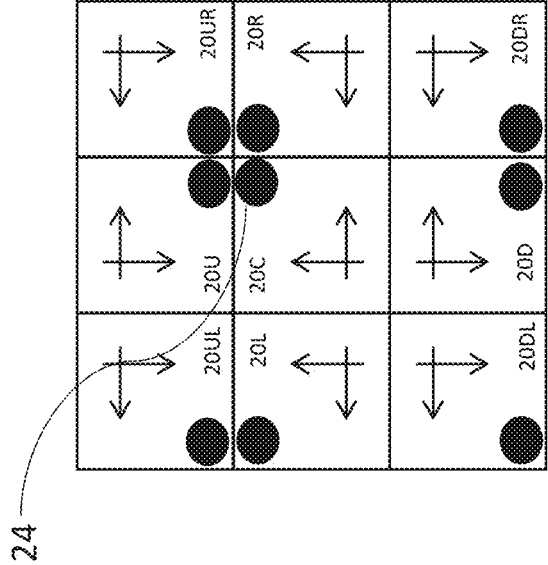
FIG. 5B is a schematic front view of the illumination pattern generated by the highlighted LED of FIG. 5A when multiplied by the reflective arrangement of FIG. 3.
Figure 5A:
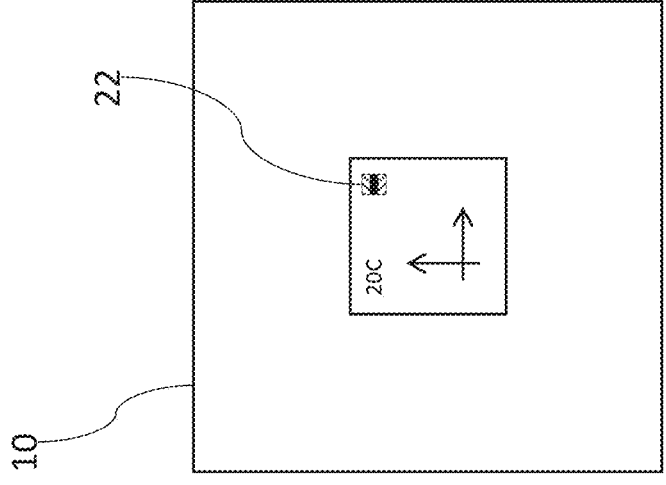
FIG. 5A is a schematic front view of the LED array highlighting the position of one LED of the array.

A schematic representation of the illumination pattern resulting from the arrangement of FIG. 3 is shown in FIGS. 5A and 5B. In FIG. 5A, the LCOS matrix 10 is illuminated by square direct light (previously described as 5) in central rectangle 20C. The arrows are shown for orientation and the pixels 22 represent red, green and blue. For clarity a single pixel from every color is shown, however all rectangle 20C can be illuminated depending which pixels are activated in 2. FIG. 5B shows the folded images generated by reflected beams 4. Rectangle reflections 20L and 20R are caused after light 4 from mLEDa is reflected once left and right by the side reflectors of reflective arrangement 16. Rectangles 20U and 20D represent reflections from the other perpendicular facets of reflective arrangement 16. Rectangles 20UR, 20UL, 20DR and 20DL represents combined reflections by the two adjacent faces of reflective arrangement 16.

As the light passes out of reflective arrangement 16 and passes through surface 18, it is preferably lightly diffused in order to generate uniform color illumination. This diffusing is only of few pixels so selective illumination of the LCOS is maintained. In FIG. 5B, this diffusing is schematically presented as pixels 22 being blurred into a spot 24.

The diffuser and end of reflective arrangement 16 preferably overlap and are located at pupil image plane of output aperture 14. As a result, substantially all of the illumination light emerging from 18 and reflected (or transmitted) by the SLM will be coupled out through pupil 14 into the waveguide (not shown).

As can be seen in FIG. 5B, the activation of every pixel in the mLEDa will in this example generate 9 illumination spots in the image plane on image generator 10. Therefore, the improved efficiency is available in cases in which the other image sections also need to be illuminated.

Here only nine rectangle images are shown, however different numbers of reflections are possible. For example, triangular cross-section of reflective arrangement 16 will generate triangular folded illumination patterns. Also, more reflections are possible if considering higher angles and multiple reflections in the reflective arrangement.

As also illustrated in FIG. 3, the projector preferably includes a controller 36 including at least one processor 38, associated with, and controlling operation of, the LED array 2 and the SLM 10. In a typical preferred implementation, the controller is configured to:

(a) receive pixel data for an image to be projected;

(b) for each of the LEDs, determine a maximum pixel value occurring within the distinct regions illuminated by the LED;

(c) determine a required level of illumination for each of the LEDs to generate the corresponding maximum pixel value, (d) calculate scaled pixel values for pixels of the SLM to generate pixel outputs corresponding to the image to be projected when illuminated by the LEDs according to the required levels of illumination;

(e) actuate the SLM according to the scaled pixel values; and (f) actuate the LED array according to the required levels of illumination.

Details of certain implementations of an algorithm are illustrated with reference to FIG. 6. Specifically, FIG. 6 represents schematically an algorithm for display an input image 50 while achieving enhanced power efficiency from the folding illumination system.

The image is first convolved with the predicted blurring kernel comprised of aberrations, pixels size and diffuser (or MLA) spread distribution (step 51). The generated image is then 'reverse folded' so every image section oriented according to its projection back on the mLEDa 29 (step 52).

Now the illumination per mLEDa pixel is selected as the maximum power of all projected sections of the image (step 53). A cross-section of the image 30 shows all projected sections' intensity, where the dashed line represents the selected illumination power.

After the mLEDa illumination power is selected (step 54), the activation of the image matrix 10 is determined as the division of the image by the illumination across the image 31 (refolding the illumination pattern) in step 55. This division will always be smaller than 1 therefore, as required, the image matrix will attenuate were needed (step 56).

Figures 7A, 7B, 7C:
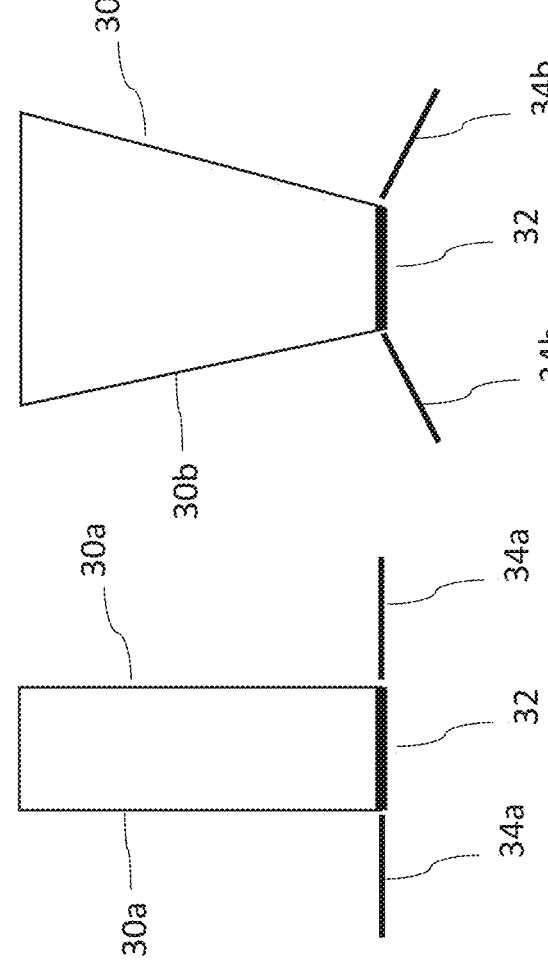
FIGS. 7A-7C are schematic representations of implementations of reflective arrangement with one or more pair of parallel, diverging and converging reflectors, respectively.

Turning finally to FIGS. 7A-7C, in the implementations discussed thus far, the reflectors making up reflective arrangement 16 are parallel reflectors, resulting in a constant cross-sectional shape along the length of the reflective arrangement. This option is illustrated in FIG. 7A, in which pairs of opposite reflectors (e.g., faces of a cuboid prism) 30a are parallel. It should be noted, however, that the invention is not limited to those cases, and the reflective arrangement can alternatively include at least one pair of diverging reflectors 30b (FIG. 7B) or at least one pair of converging reflectors 30c (FIG. 7C).

Specifically, as a point of reference, in FIG. 7A, side facets 30a are perpendicular to a plane 32 of the LED array, thereby generating image planes 34a by folding plane 32 about the reflecting surface 30a. This results in the illumination source plane 32 and is imaged by perpendicular reflectors 30a to images 34a, coplanar with illumination source 32. FIGS. 7B and 7C illustrate cases in which the side reflectors are tilted as shown by reflectors 30b and 30c, respectively. In these cases, the reflections of the image plane will be tilted correspondingly, as shown by images 34b and 34c. This can be beneficial, for example, if the imaging optics has field curvature, and the position of reflected images 34b or 34c are chosen to approximate this curvature.

It will be appreciated that the above descriptions are intended only to serve as examples, and that many other embodiments are possible within the scope of the present invention as defined in the appended claims.

What is claimed is:

1. A projector for projecting an image comprising:

(a) an LED array comprising a plurality of separately-controllable LEDs for generating illumination;

(b) a spatial light modulator (SLM) deployed for modulating an optical property of incident illumination for generating an image;

(c) illumination optics deployed to receive illumination from said LEDs and direct the illumination as a converging beam towards said SLM;

(d) projection optics deployed to project the image generated by said SLM so as to generate a projected image; and (e) a reflective arrangement comprising at least four planar reflectors, said reflective arrangement being deployed between said LED array and said illumination optics such that light from each of said LEDs illuminates a first region of said SLM by direct transmission from said LED via said illumination optics and additional regions of said SLM, distinct from said first region, via reflection in at least one of said planar reflectors, said at least three planar reflectors forming a polygonal shape, said plane reflectors generating a set of at least nine distinct regions of illumination on said SLM for each of said LEDs.

2. The projector of claim 1, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

3. A projector for projecting an image comprising:

(a) an LED array comprising a plurality of separately-controllable LEDs for generating illumination;

(b) a spatial light modulator (SLM) deployed for modulating an optical property of incident illumination for generating an image;

(c) illumination optics deployed to receive illumination from said LEDs and direct the illumination as a converging beam towards said SLM;

(d) projection optics deployed to project the image generated by said SLM so as to generate a projected image; and (e) a reflective arrangement comprising four planar reflectors, said reflective arrangement being deployed between said LED array and said illumination optics such that light from each of said LEDs illuminates a first region of said SLM by direct transmission from said LED via said illumination optics and additional regions of said SLM, distinct from said first region, via reflection in at least one of said planar reflectors, said four planar reflectors deployed to form a rectangular shape, said plane reflectors generating a set of at least nine distinct regions of illumination on said SLM for each of said LEDs.

4. The projector of claim 3, wherein said four planar reflectors form two pairs of parallel reflectors.

5. The projector of claim 4, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

6. The projector of claim 3, wherein said four planar reflectors include at least one pair of diverging reflectors.

7. The projector of claim 6, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

8. The projector of claim 3, wherein said four planar reflectors include at least one pair of converging reflectors.

9. The projector of claim 8, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

10. The projector of claim 3, wherein said four planar reflectors are provided by external surfaces of a light-guiding prism.

11. The projector of claim 10, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

12. The projector of claim 3, wherein an end of said reflective arrangement defines an illumination stop, and wherein said illumination stop is imaged by said illumination optics and said projection optics onto an exit aperture of the projector.

13. The projector of claim 12, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

14. The projector of claim 3, further comprising a controller including at least one processor, said controller being associated with said LED array and with said SLM, said controller being configured to:

(a) receive pixel data for an image to be projected;

(b) for each of said LEDs, determine a maximum pixel value occurring within the distinct regions illuminated by said LED;

(c) determine a required level of illumination for each of said LEDs to generate the corresponding maximum pixel value, (d) calculate scaled pixel values for pixels of said SLM to generate pixel outputs corresponding to the image to be projected when illuminated by said LEDs according to said required levels of illumination;

(e) actuate the SLM according to said scaled pixel values; and (f) actuate the LED array according to said required levels of illumination.

* * * * *